United States Patent
Crofford (10) Patent No.: US 11,716,683 B2
(45) Date of Patent: Aug. 1, 2023

(54) METHOD AND SYSTEM FOR AGGREGATING POWER OUTAGE DATA AND UTILIZATION

(71) Applicant: DISH Wireless L.L.C., Englewood, CO (US)

(72) Inventor: Jon Crofford, Denver, CO (US)

(73) Assignee: DISH Wireless L.L.C., Englewood, CO (US)

( * ) Notice: Subject to any disclaimer, the term of this patent is extended or adjusted under 35 U.S.C. 154(b) by 0 days.

(21) Appl. No.: 17/867,113

(22) Filed: Jul. 18, 2022

(65) Prior Publication Data
US 2022/0353808 A1    Nov. 3, 2022

Related U.S. Application Data (63) Continuation of application No. 17/004,537, filed on Aug. 27, 2020, now Pat. No. 11,395,223.

(51) Int. Cl.
*H04W 52/02* (2009.01)
*H04W 24/00* (2009.01)

(52) U.S. Cl.
CPC ....... *H04W 52/0206* (2013.01); *H04W 24/00* (2013.01); *H04W 52/0251* (2013.01); *H04W 52/0296* (2013.01)

(58) Field of Classification Search
CPC . H04W 52/0206; H04W 24/00; H04W 24/02; H04W 24/04; H04W 52/0251; H04W 52/0296
See application file for complete search history.

(56) References Cited

U.S. PATENT DOCUMENTS

2019/0274105 A1*  9/2019  Papa ................. H04W 52/0206

* cited by examiner

*Primary Examiner* — Keith Ferguson
(74) *Attorney, Agent, or Firm* — KW Law, LLP (57) ABSTRACT

Systems, devices and automated processes are provided for configuring backup battery power for RF radio operations at a base station, including a module configured to communicate with an API tool to receive a plurality of data sets using an open API format about metrics of various operating distributed power sources; a cell site module configured to monitor power usage at a cell site and to generate a series of data sets about the power usage at the cell site; an analysis module configured to correlate the plurality of data sets of the various operated distributed power sources with the series of data sets of power usage at the cell site; the analysis module to forecast a frequency and a duration of a power outage at the cell site based on metrics of correlated data of the data sets of the various operated distributed power sources and the series of data sets about power usage at the cell site; and a backup power supply configured with a capacity at the cell site based on the metrics derived from the correlated data wherein the capacity backup power supply is determined in accordance the frequency and the duration of the power outage at the cell site.

16 Claims, 5 Drawing Sheets

METHOD AND SYSTEM FOR AGGREGATING POWER OUTAGE DATA AND UTILIZATION

PRIORITY CLAIM

This application is a continuation of U.S. patent application Ser. No. 17/004,537 (now U.S. Pat. No. 11,395,223) filed on Aug. 27, 2020, which is incorporated herein by reference.

TECHNICAL FIELD

The following discussion generally relates to power management in wireless communications systems. More particularly, the following discussion relates to systems, devices, and automated processes to collect data related to a network power outage and power demand by radio frequency (RF) radios to forecast commercial power interrupts or failures in 5G data networks for enhanced configuration of a backup power supply (i.e., backup batteries) for use at cell sites to maintain appropriate RF radio operating loads.

BACKGROUND

Newer 5G data and telephone networks are being developed to provide greatly improved bandwidth and quality of service to mobile telephones, computers, internet-of-things (IoT) devices, and the like. As these newer high-bandwidth networks evolve, however, additional challenges are being recognized. A 5G base station is generally expected to consume roughly three times as much power as a 4G base station. And more 5G base stations are needed to cover the same area.

Today RF radios and antennas use a fixed input power that is based on full load RF conditions. When commercial power is interrupted, lost or dramatically reduced, the RF radio executes a backup procedure that relies on drawing power from a set of backup batteries. The cost of each battery can be high, and in many instances, the available capacity of the backup is not fully utilized. This is because today, there are limited tools for forecasting the required needs based on location, usage, and length of power outages for a cell site. In other words, the RF radio is not informed nor is the RF radio configured to be informed of a likelihood of commercial power loss and therefore current requirements for backup batteries at a cell site are based on fixed requirements that do not take into account current real-world data about a power outage length, likelihood of occurrence, and actual amounts of power drawn at the cell site based on user traffic that will likely be occurring.

Next-generation smart grid technology is emerging, which will result in the integration of advanced technologies and applications for achieving a smarter infrastructure that will generate data for further analysis. The Smart grid will be characterized by a two-way flow of power in an electrical network, and information in communication networks. That is, with the integration of advanced technologies and applications for achieving a smarter electricity grid infrastructure, data from different applications will be generated for further analysis. The smart grid will also interoperability between different system components by using application programming interfaces (APIs) and middleware to provide communications with third parties not directly associated with power systems.

The U.S. Energy Information Administration (EIA) is providing tools for open data by making access to power data available through an Application Programming Interface (API) and other open data tools to better serve the public. The data in the API is also available in the hulk file, in Excel via the add-in, in Google Sheets via an add-on, and via widgets that embed interactive data visualizations of EIA data on any website. By making EIA data available in machine-readable formats, the consumer has access to valuable public data about the domestic power grid.

Therefore, it is desirable to better configure backup batteries at a cell site based on collecting and analyzing accessible EIA data about power outages, power consumption at a cell site, and the actual drawn down of power from the backup batteries.

It is desirable to configure backup batteries not only based on required backup power regulations but to enable a flexible backup battery configuration based on EIA data analysis that can, in turn, reduce fixed backup battery structural costs at cell sites.

It is desirable to piggyback on the cell site communication infrastructure, and tie known cell site power metrics to aggregated EIA data derived from smart grid metering and monitoring and to collect, and aggregate power usage data on a regional, local and a network basis for analysis on cell site commercial power requirements.

It is desirable to change required levels on the input power setting of the RF radio in response to feedback messages and analysis of power outages at localized cell sites radio to reduce the operating RF radio power consumption in tangent with the selection of the appropriate battery configurations.

It is desirable to provide systems and methods that when the RF radio of the operating cell (i.e., gNB node) incurs a drop or interrupt of commercial power at the input to the base station appropriate selection and configuration of available backup batteries can be made or future forecasted in a network experiencing a power outage.

It is desirable to provide systems and method for operating management of base stations components that enable the switching of operating load profiles or enabling automated systems to reconfigure component based on forecasted power outages to change the mode of operation of the RF radio transmitter based on evaluating if a degraded RF radio service with a forecasted user base can be implemented under the current conditions.

It is therefore desirable to create systems, devices, and automated processes that can monitor and forecast commercial power interrupts and failures and allow different configurations of base station components to operate in the desired cell network. It is also desirable to improve connectivity and to operate time for base station equipment operating in backup power modes within 5G or similar networks.

Furthermore, other desirable features and characteristics of the present invention will become apparent from the subsequent detailed description and the appended claims, taken in conjunction with the accompanying drawings and the foregoing technical field and background.

DESCRIPTION OF THE DRAWINGS

The exemplary embodiments will hereinafter be described in conjunction with the following drawing figures, wherein like numerals denote like elements, and wherein.

BRIEF SUMMARY

Systems, devices and automated processes are provided to reduce the power draw of a backup power supply to a base station and cell site in response to a power interrupt or power loss. In an embodiment, a system for prolonging backup battery power for RF radio operations at a base station is provided. The system includes a radio controller configured to control routing of power from the backup battery; a detection unit for determining whether a source of commercial power is about to or has failed; a control unit including an element management system located remotely to communicate with an RF radio controller, a server, and router to change a setting of a required level to reduce the power to the cell; a feedback mechanism responsive to the loss of power to crop the input power; an output control unit to reduce the output power from the RF radio; and battery controller configured to reduce the draw on the UPS since input power requirement is dropped.

In various exemplary embodiments, the method further includes the element management system instructed by an automated workflow responsive to the detected loss of power. The method further includes the element management system changing settings of components based on data communicated from the cell site server. The method further includes the element management system changing settings of components of multiple cell sites based on collective data communicated by multiple cell site servers. The method further includes the element management system via logic monitoring the data of components on the cell site. The method further includes the element management system cropping input power to individual cell sites based on a scheduled operation to lessened effects of node degradations to users.

In another exemplary embodiment, a computer program product tangibly embodied in a computer-readable storage device and including a set of instructions that when executed by a processor perform a method for an operational mode of a base station when a power interrupt or power loss is detected is provided. The method includes: an element management system for implementing the operational mode of a radio receiver of a cell or base station by an automated workflow in response to collective data of a network; activating the automated workflow in response to collective data indicative of the power interrupt or the power loss to a network, cell site, and base station to crop input power to at least a radio receiver of the cell site and base station; communicating with the radio receiver and a server via a cell site router to exchange messages about requirements of components of the cell site based on current operating data of the cell site; reducing the output power of the radio receiver by changing settings of cell site components to reduce a maximum radio receiver load while taking into account data indicative of component loads in the operating cell site; and reducing an amount of power drawn by at least one back power supply activated in response to the power interrupt or power loss to extend an operation time of the backup power supply.

In various exemplary embodiments, the method further includes the element management system instructed by an automated workflow responsive to the detected loss of power. The method further includes the element management system changing settings of components based on data communicated from the cell site server. The method further includes the element management system changing settings of components of multiple cell sites based on collective data communicated by multiple cell site servers. The method further includes the element management system via logic monitoring the data of components on the cell site. The method further includes the element management system cropping input power to individual cell sites based on a scheduled operation to lessened effects of node degradations to users.

In yet another exemplary embodiment, a method executed by a network power management system having a processor, memory, and input/output interfaces, wherein the processor is configured to execute instructions stored in the memory to extend backup battery life is provided. The method includes an element management system for implementing the operational mode of a radio receiver of a cell or base station by an automated workflow in response to collective data of a network; activating the automated workflow in response to collective data indicative of the power interrupt or the power loss to a network, cell site, and base station to crop input power to at least a radio receiver of the cell site and base station; communicating with the radio receiver and a server via a cell site router to exchange messages about requirements of components of the cell site based on current operating data of the cell site; reducing the output power of the radio receiver by changing settings of cell site components to reduce a maximum radio receiver load while taking into account data indicative of component loads in the operating cell site; and reducing an amount of power drawn by at least one back power supply activated in response to the power interrupt or power loss to extend an operation time of the backup power supply.

In various exemplary embodiments, the method further includes the element management system instructed by an automated workflow responsive to the detected loss of power. The method further includes the element management system changing settings of components based on data communicated from the cell site server. The method further includes the element management system changing settings of components of multiple cell sites based on collective data communicated by multiple cell site servers. The method further includes the element management system via logic monitoring the data of components on the cell site. The method further includes the element management system cropping input power to individual cell sites based on a scheduled operation to lessened effects of node degradations to users. The method further includes the element management system including a master base station for communicating with each based station to regulate input power in response to a power loss of the network. The method further includes the network management system including a central power management system receiving collective data from the network for monitoring each cell site for power outages.

DETAILED DESCRIPTION

The following detailed description is intended to provide several examples that will illustrate the broader concepts that are set forth herein, but it is not intended to limit the invention or the application and uses of the invention. Furthermore, there is no intention to be bound by any theory presented in the preceding background or the following detailed description.

Smart grid operations are becoming more prevalent and the implementation of the smart grid fosters two way communication on demand responses, distributed monitoring of power sources, gathering of data of localized power consumption, and better data about power interruptions and backouts.

Various terminology are used in the present application. For example, an Application Programming Interface ("API") is an interface that is defined in terms of a set of functions and procedures, and enables a program to gain access to facilities (i.e. power source, distribution of power etc.) within an application. In this case, an open API can be used to gain access to data of various distributed power entities, transmission of power, and monitored data of power source operations.

Wireless mobile communication technology uses various standards and protocols to transmit data between a base transceiver station (BTS) and a wireless mobile device. The deployment of a large number of small cells presents a need for energy efficiency power management solutions in fifth-generation (5G) cellular networks. While massive multiple-input multiple outputs (MIMO) will reduce the transmission power it results in not only computational cost but for the computation required, the input power requirements for transmission can be a significant factor for power energy efficiency (especially when operating in a backup mode) of 5G small cell networks. In 3GPP radio access networks (RANs) in LTE systems, the BTS can be a combination of evolved Node Bs (also commonly denoted as enhanced Node Bs, eNodeB s, or eNBs) and Radio Network Controllers (RNCs) in a Universal Terrestrial Radio Access Network (UTRAN), which communicates with the wireless mobile device, known as user equipment (UE). The downlink (DL) transmission can be a communication from the BTS (or eNodeB) to the wireless mobile device (or UE), and an uplink (UL) transmission can be a communication from the wireless mobile device to the BTS.

The power consumption of base stations (BS's) is classified into three types, which are the transmission power, the computational power, and power for base station operation. The transmission power is the power used by the power amplifiers (PAs) and RF chains, which perform the wireless signals change, i.e., signal transforming between the baseband signals and the wireless radio signals. The computation power represents the energy consumed at baseband units (BBU's), which includes digital single processing functions, management, and control functions for BS's and the communication functions among the core network and BSs. All these operations are executed by software and realized at semiconductor chips. The additional power represents the power consumed for maintaining the operation of BS's. More specifically, the additional power includes the power lost at the exchange from the power grid to the main supply, at the exchange between different direct current to direct current (DC-DC) power supply, and the power consumed for active cooling at BS's.

Power loss and outages are commonplace in networks today as a result of natural disasters, rolling brownouts, etc. Base stations include backup power (e.g., batteries), these forms of backup power may not provide sufficient power during lengthy power outages, use of commercial wireless communications services may increase due to users' needs and/or desires.

Operating the BS in a sleeping mode can be a way to reduce energy consumption in cellular networks, however, this method focuses on the output power and does not consider a loss or interrupt of the commercial power on the input to the BS. Hence, queueing decision techniques for BS sleeping techniques while can maximize energy-efficient utilization of the BSs in a green communication network is not applicable when commercial power is lost to the BS.

The physical or network node either represents an access node (e.g., Radio Distributed Units) or non-access node (e.g., servers and routers), while a physical link represents an optical fiber link between two physical nodes. Every physical node is characterized by a set of available resources, namely computation (CPU), memory (RAM), and storage, which define the load characteristics of a cell. Each physical link is characterized by a bandwidth capacity and a latency value, which is the time needed by a flow to traverse that link. Finally, both physical nodes and links have associated utilization power requirements for each type of available resource.

The power delivery to a BS is rectified and regulated to a nominal measured DC voltage 48 (i.e., voltage direct current (VDC)), which is fed to a backup battery or a set of backup batteries for charging. The rectifier unit includes circuitry to keep the batteries fully charged and ready in case of a commercial power interrupt or failure. At full charge, the backup battery is kept at a voltage in the vicinity of 50 volts. The battery pack parameter in general per customer's requirement is in the order or 2-hour work time under 100 W AC system, 48.1V/65 Ah battery that can last of about 150 minutes with a full load.

There are at least two scenarios in which a power outage that affects the cell site and coverage area will trigger an unexpected peak in traffic demand. First, when normal activities are interrupted caused when a high number of UEs are engaged on the wireless network and second, if Wi-Fi access points aren't functioning, requiring the UEs to use the cellular networks instead.

Base stations typically use a 48V input supply that is stepped down by DC/DC converters to 24V or 12V, then further stepped down to the many sub rails ranging from 3.3V to less than 1V to power ASICs in the baseband processing stages.

Figure 1:
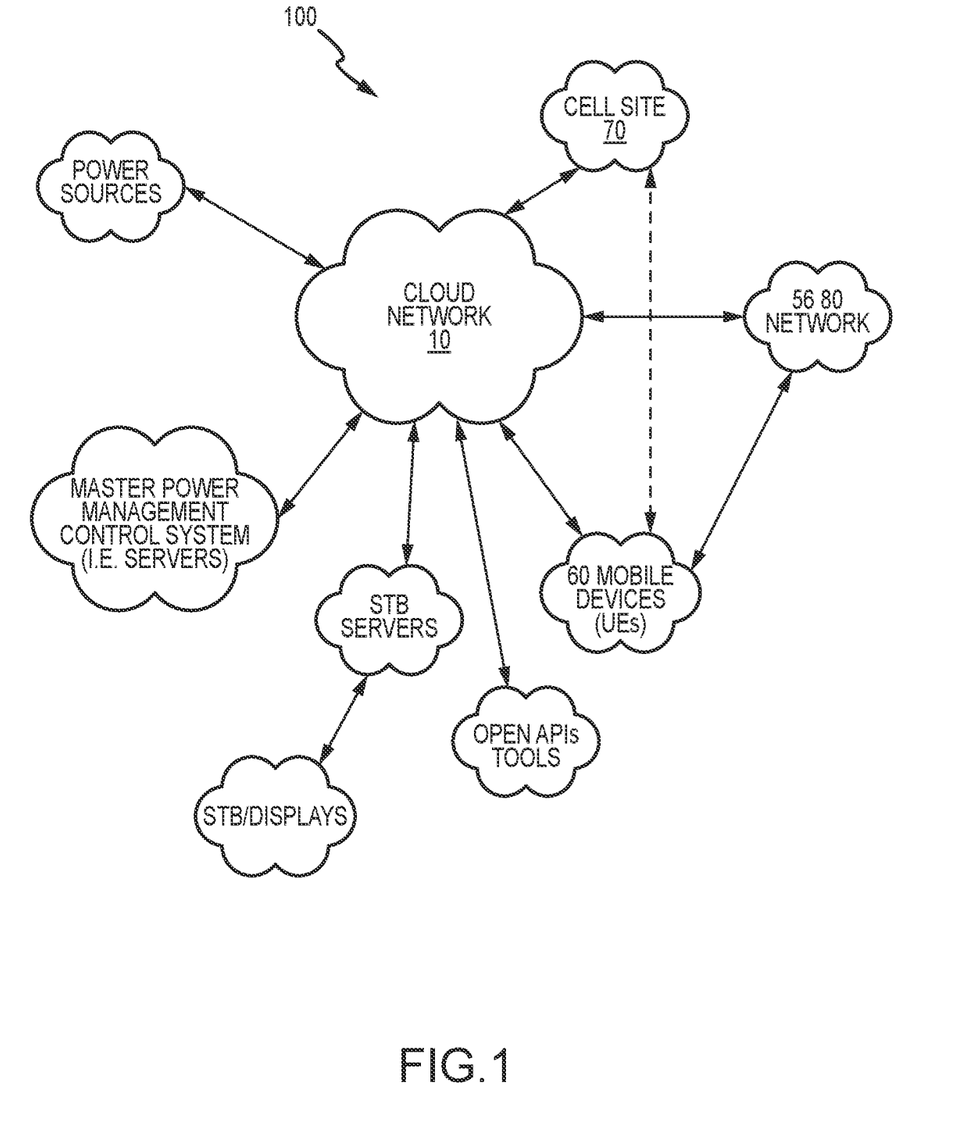
FIG. 1 is an exemplary diagram of the server network and 5G network for analysis for backup battery selection in accordance with an embodiment.

FIG. 1 is a high-level diagram of the server network and 5G network for analysis for backup battery selection in accordance with an embodiment. In FIG. 1 there is shown an exemplary cloud network 10 that connects together distributed power sources 20 with various open API tools 50 for accessing data about power operations from the distributed power sources 20, and cell sites 70, servers 30, set-top box servers 40, and mobile devices 60 in communication with the network cloud 10. The mobile devices (UEs) 60 are also in communication with the cell sites 70 via the 5G network 80. In other words, disparate networks of the network cloud 10 and the 5G network 80 are connected where the cloud network 10 provides a back channel communication path to the cell site 70, the mobile devices 60, and the set-box servers 40. In this regard, information about the distributed power sources 20 to which the cell sites 70 receive commercial power for powering the 5G network 80 can be communicated via the backchannel of the cloud network 10 to the set-top box servers 40 for a display of the STB/ displays 45.

Figure 2:
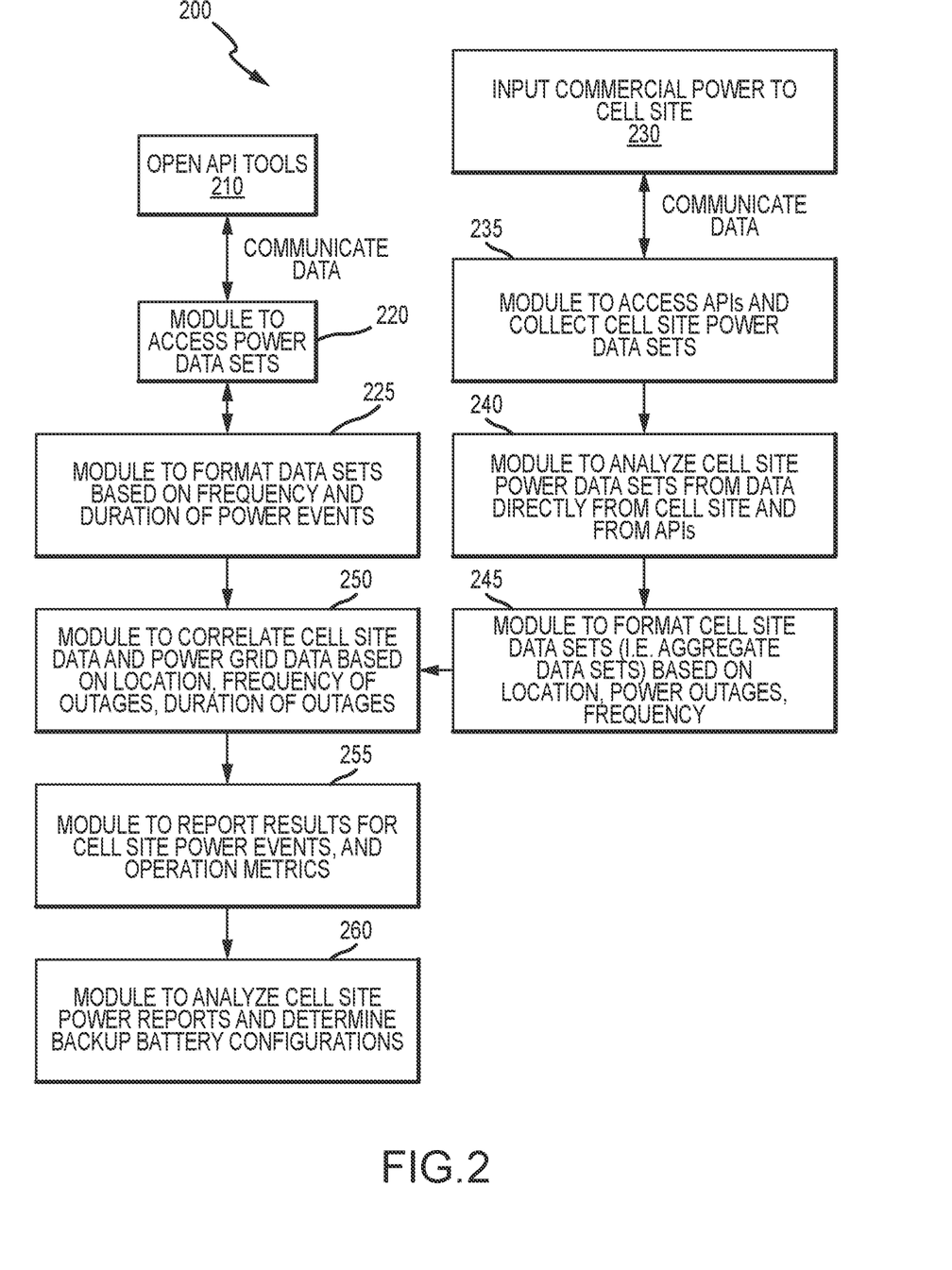
FIG. 2 is an exemplary diagram of the analytics modules that collect data via open APIs for monitoring distributed power source activities, for determining the frequency and duration and power outages, for correlating the power data, and for determining based on frequency, outage time, and power drawn by the 5G cell site, the appropriate capacities and arrangements of the backup power supplies for cell sites in accordance with an embodiment.

FIG. 2 is an exemplary diagram of the analytics modules that collect data via open APIs for monitoring distributed power source activities, for determining the frequency and duration and power outages, for correlating the power data, and for determining based on frequency, outage time, and power drawn by the 5G cell site, the appropriate capacities and arrangements of the backup power supplies for cell sites in accordance with various embodiments.

In FIG. 1, an open API type tool 20 is accessed via the cloud network (i.e., web access tool) to receive real-time data about operations of various distributed power sources (in FIG. 1, 20). For example, the U.S. Energy Information Administration (EIA) provides an open API tool hourly electricity operating data of various distributed power sources. The data is collected by smart meters that monitor the electric grid power generated from power plants or other sources that make up the domestic electrical grid network. The data can also include a report of actual and forecast demand, net generation, and the power flowing between electric systems. The EIA's open API tool can provide real-time demand data, plus analysis and visualizations of hourly, daily, and weekly electricity supply and demand on a national and regional level of approximately 66 electric power systems that make the domestic power grid. The reporting data that is provided can be analyzed using various analytic solutions hosted by the servers (FIG. 1, 30) to provide analytics of electric system recovery after power interruptions and to help evaluate the effects of renewable energy, smart grid, and demand response programs on power system operations. This data can facilitate more informed analysis and policy decisions on a national and regional level.

In FIG. 2 the data collected via the open API tool can be assessed against locations of 5G network cell sites (FIG. 1, 70). For example, the collected data can be coordinated through a pipeline processing system to correlate to locations for commercial power supplied to each cell site on local levels. FIG. 2 describes a series of block diagrams that illustrate modules that compose the master power management system (FIG. 1, 30) to determine the frequency and duration of local commercial power interrupts for cell sites.

The open API tool 210 can be programmed, or the EIA's open API tool can be accessed. Initially, the access module 220 is registered and authenticated to enable access to the open API tool. The access module 200 can be initialized to access the open API tool 210 continuously, hourly, daily, etc. to receive data sets of reports of distributed power source activity in the power grid. The received data can then be formatted by a module to prioritize the data to determine the locality, frequency, and duration of a power interrupt event. In a similar, simultaneously or not, the commercial power to the cell site can be accessed via open API tools 230 that provide data of the cell site activity. For example, this activity may include the number of users accessing the cell site, the power consumed, the slicing activity at a cell site, the bandwidth parts in operation at a cell site in conjunction with the commercial power in use. The open API tool 230, when accessed, would provide reporting data or a series of data sets of loads, load usage, duration of power interrupts, frequency of power interrupts at a cell site. Module 235 can be configured to implement an accessing scheme, to access cell sites in the 5G network via an open API to retrieve commercial power data associated with localities of each cell site. For example, the open API tool 210 can be implemented with setting for each cell site locality and the module 235 can use a schema with preconfigured settings for the API tool 210 to access each cell site locality and commercial power input to retrieve data of demands of commercial power in the locality of the cell site.

Also, data sets that are retrieved can include the frequency and the duration of commercial power interrupt in the locality that equates to the power outage experienced at the cell site. In this manner, a back channel communication path is create to monitor the commercial power, demand of the commercial power and activity of a cell site. In addition, data sets can be received from the controller of the new radio of transmission and reception of data, as well as use of the backup power supplies locally located. Further, the controller of the new radio at the cell site may also receive instructions and data from a centralized controller and server that aggregates data from all the cell sites and aggregate use of backup power supplies. The analysis module 240 is configured to analysis the data sets of the commercial power activity to equate the demand for the commercial power with the users at the cell site, the throughput (i.e. bandwidth parts in use) in operation of the New Radio transmitter and receiver in use, and the slice operations that are occurring.

In addition, the demand data with the outage date, can be analyzed to forecast outages such as rolling blackouts and other power events based on the localized data. The correlation module 250 correlated the data sets of power outages and other activity retrieved in communication with the broader use (i.e., the power grid) of the open API tool 210 to the local power availability at the cell site and aggregated cell site data to make determinations associated with forecasting power outages at the cell site, and availability of power in response to demand. The reporting module 255 reports the power activity at the cell site in the 5G network and forecasts the frequency and duration of power outages. The backup power supply determination module 260 determines based on the reported data, the requirements for backup power supplies at each cell site, and the shifting of resources to maintain adequate power consumption at a cell site.

In various exemplary embodiments, it should be noted that based on the derived open API power data, the demand realized for electricity can differ from the day-ahead forecast and can vary within the hour. As an example, power management systems balance power source generations to match real-time demand; in this case the real-time demand at various cell sites. The alternating current (AC) power system or commercial power input to a cell site is designed to operate at a frequency of 60 cycles per second, or 60 Hertz. If supply and demand fall out of balance, the AC frequency will increase or decrease, a condition that can cause system components and consumer equipment to fail. To prevent permanent damage, the power system is designed to isolate any problem and prevent an imbalance can result in a widespread blackout.

When actual demand significantly exceeds forecasted levels, balancing authorities call upon generating capacity held in reserve. This can indicate that the electric system is under stress. However, when actual demand is significantly lower than forecast demand, the system has over-committed generation capacity. Daily load shapes vary by region, climate, and time (daily, monthly, seasonally).

In various exemplary embodiments, the cell site in the 5G network is monitored for power consumption by a centralized monitor. The cell sites monitored data are coordinated with the power data from the regional power sources so that cells sites at particular regions are associated with the power regionally and locally supplied. That is, the power data is compared to the cell site data for interruptions in the network. This data is collated so that usage and the outages at cell sites and regions can be compared, and aggregated over a period of time. Based on the outages, and comparisons, optimum backup battery sets are selected at each cell site to maintain the power at the required levels for forecasted power outages and also taking into account the frequency of the outages.

Figure 3:
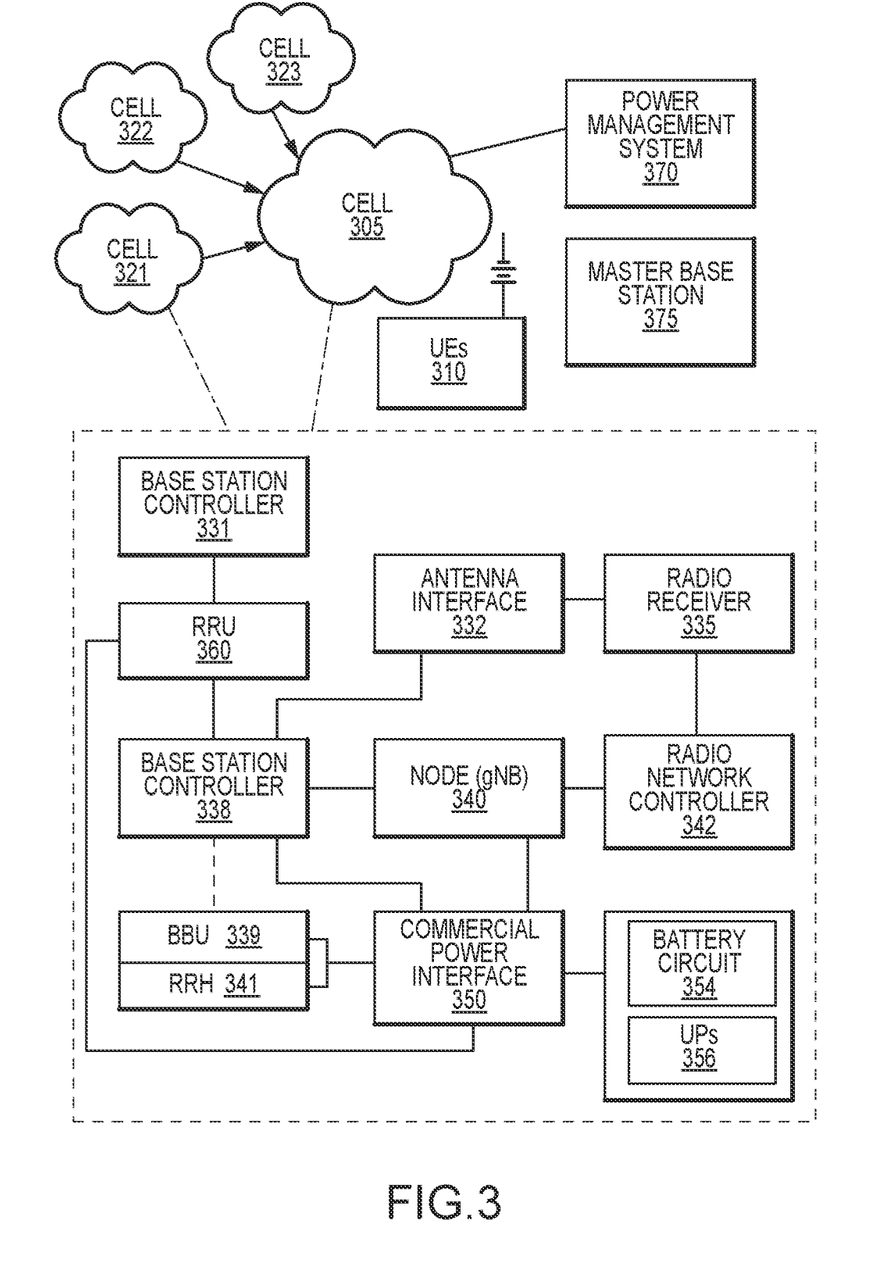
FIG. 3 is an exemplary diagram of the backup supply with components of a cell site in accordance with an embodiment.

FIG. 3 is a diagram of the backup supply of a cell site in accordance with an embodiment. FIG. 3 shows a graphical representation of a 5G or other data network 300 that includes multiple cells 321, 322, 323 that provide access to a network 305 for any number of UE devices 310. Although FIG. 3 shows only one user equipment (UE) device 310 for simplicity, in practice the concepts described herein may be scaled to support environments 300 that include any number of devices 310 and/or cells 321-323, as well as any sort of network architecture for assigning bandwidth to different slices and performing other tasks, as desired.

In the example of FIG. 3, a mobile telephone or other user equipment (UE) device 310 suitably attempts to connect to network 305 via an appropriate access cell 321, 322, 323. In the illustrated example, each cell 321 includes the components for transmission of a base station controller 331, a base station transceiver 338, a node 340, an RF Radio 335, a Radio Network controller 342; the linking components of the antenna interface 332 and the antenna 333; and the power components of the commercial power interface 350, the backup power supply 352 of a battery circuitry 354 and UPS or batteries 356.

The commercial power interface 350 may receive power AC power from a public utility or other sources. The antenna 333 and antenna interface 332 control the signal to the UEs 310. The radio network controller 342 can control the RF transmit output via the RF radio 335 to conserve power usage to reduce the power draw on the USP 356. By reducing the communication bit rate, the RF power can be reduced in decibels ("dB"). Additionally, step reductions can be implemented. The battery circuit 354 can be configured as a rectifier type switch that can switch the output power from the UPS 356 at multiple levels. The Base Station controller 338 can include power control features to control the power drawn by the base station 338. Additionally, the base station controller 338 can communicate wirelessly with a master power management system 370 that communicates with open API tools of the smart power grid, and various element management systems and can confirm the AC power outage or interrupt on the front end to change the power input power levels of multiple small cells 321, 322, and 323, and a number of UEs 310 connected to the Node 340 and resources in a slice of a node (gNB).

In an exemplary embodiment, UEs 310 can be configured with a maximum of 4 BWP for Downlink and Uplink, but at a given point of time, only one BWP is active for downlink and one for uplink. The BWPs can be configured to enable each of the UEs 310 to operate in a narrow bandwidth, and when the user demands more data (bursty traffic), it can inform gNB to enable full bandwidth. When gNB configures a BWP, it includes parameters: BWP Numerology (u) BWP bandwidth size Frequency location (NR-ARFCN), CORE-SET (Control Resource Set). For the downlink, the UE is not expected to receive PDSCH, PDCCH, CSI-RS, or TRS outside an active bandwidth part. For the uplink, UE 310 shall not transmit PUSCH or PUCCH outside an active bandwidth part. UEs 310 are expected to receive and transmit only within the frequency range configured for the active BWPs with the associated numerologies. However, there are exceptions; a UE may perform Radio Resource Management (RRM) measurement or transmit sounding reference signal (SRS) outside of its active BWP via measurement gap In an exemplary embodiment, the radio network controller 331 can implement logic is implemented with computer-executable instructions stored in a memory, hard drive, or other non-transitory storage of device for execution by a processor contained within. Also, the radio network controller 331 can be configured with a remote radio unit (RRU) 360 for downlink and uplink channel processing. The RRU 360 can be configured to communicate with a baseband unit (BBU) 339 of a base station controller 331 via a physical communication link and communicate with a wireless mobile device via an air interface.

In various alternate embodiments, the base station 338 can be separated into two parts, the Baseband Unit (BBU) 339 and the Remote Radio Head (RRH) 341, that provides network operators to maintain or increase the number of network access points (RRHs) for the node (gNB), while centralizing the baseband processing functions at a master base station 375. Using a master C-RAN base station 375, the master power management system, 370, can be instructed to coordinate operations in the tangent of power levels of multiple cells (321, 322, and 323). The master power management system 370 can receive open API data, correlate open API data with operating power data aggregated for multiple cell sites to configure battery arrangement when there is a power outage at a cell site, and to adapt power usage to configured batteries at cell site in accordance with forecasted power outages, frequencies of power outages and durations of power outages.

Figure 4:
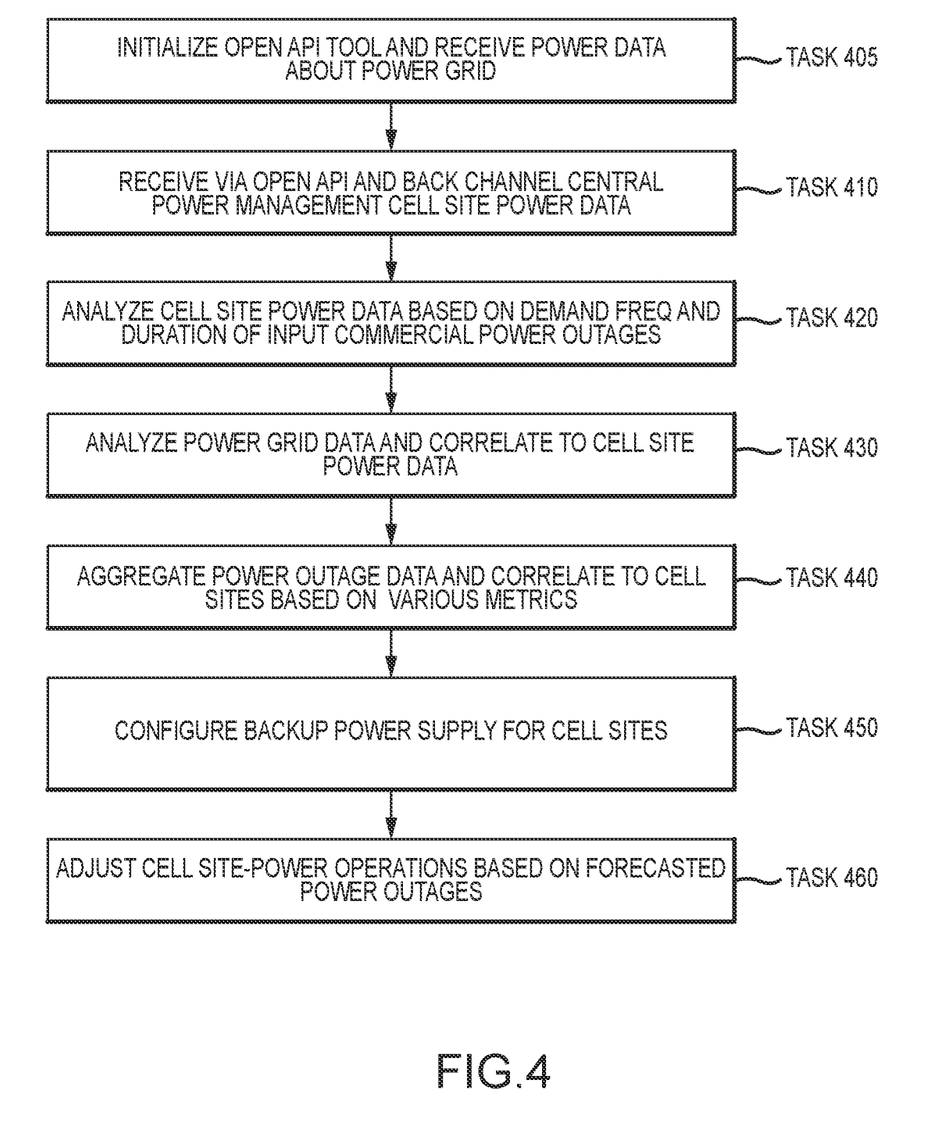
FIG. 4 is an exemplary flowchart for accessing open API power data and for forecasting power outages at cell sites and for configuring backup batteries at cell sites in accordance with an embodiment.

FIG. 4 is an exemplary flowchart for accessing open API power data and for forecasting power outages at cell sites and for configuring backup batteries at cell sites in accordance with an embodiment. In FIG. 4, at task 405 a central power management module in communication with the cell site initializes an open API tool to receive power data about the power grid and requests data set of real-time data of power demand, power supplied and power outages in regions, localities, and areas related to cell site operations. At task 410, the central power management system can request via an API data tool to receive power data about power demand, power operations, and power outages throughout a smart grid. In conjunction, at task 420, the central power management system can receive operating power data of a cell site and, through backchannel communications via an element management system, receive operating power data of the 5G network. Further, at task 420, the central power management system can aggregate the operating power data among the cell sites based on power events that include durations of power outages, frequency of power outages, and likelihood-based on-demand at cell sites of power interruptions. At task 430, the power grid data received from the open API tool can be correlated with the aggregated cell site data based on the frequency and duration of power outages. At task 440, the aggregated power data for the cell sites can be analyzed to forecast demand, usage, outages, and other metrics at cell sites in the 5G network. At task 450, the backup power supplies can be selected based on the reported aggregated or forecasted power outages, frequency, and duration of power outages. At task 460, the cell site operations can be adjusted via instructions from the central power management system in line with the configured backup battery configurations. For example, slice operations or bandwidth parts can be changed to better align with the selected battery configuration for forecasted power outages based on the derived and analyzed power data.

In an exemplary embodiment, the central power management system can instruct element management systems at the cell site to prevent traffic congestion and dropped calls by implementing collective scheduling between multiple cells in the case of reducing power availability due to an interruption in commercial power.

For example, for power saving when using backup batteries, channels is used at a cell can be cutoff which in turn causes less traffic and requires a lower power level or a change in the operating settings of certain beam sets at the cell site that is more consistent with certain battery selections. The signal to noise ratios can be changed or the user can be shifted over to different beam frequencies for power savings. In addition, by identifying decreases in channel data rates, coordinated control of the power supplied to particular beams can be adjusted while at the same time maintaining a certain level of beam efficacy for a backup battery configuration. Hence, the dynamic configured setting for power supplied for beam configurations used for UL and DL transmissions at the cell site can be designed to maintain current levels of beam signals across the cell site while reducing power consumed at cell sites of the network in coordinated with derived power data about power outages and forecasted power events.

Figure 5:
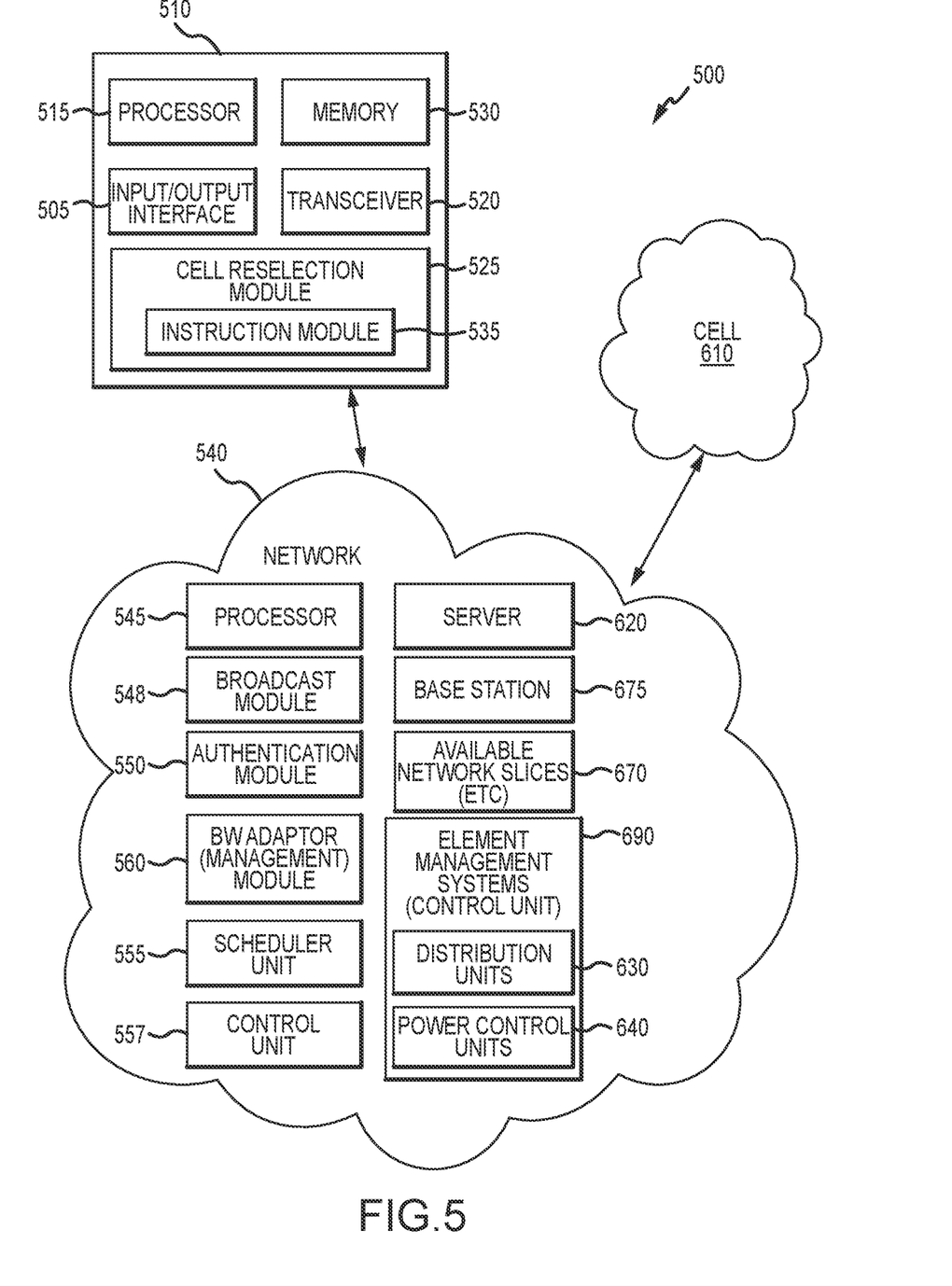
FIG. 5 is an exemplary functional diagram of the operating components of a 5G network and UEs that send power management data for use in power management and backup power configurations at a cell site in accordance with an embodiment.

FIG. 5 is an exemplary functional diagram of the operating components of a 5G network and UEs that send power management data for use in power management and backup power configurations at a cell site in accordance with an embodiment. The UE 510 includes a processor 515 for performing various logic solution functions for registering and receiving broadcast system information, initiating PDU sessions performing cell selections and reselections, ranking neighboring cells, configuring different modes of operation of the UE, etc. . . . for use in particular backup battery configurations. The UE 510 may include a cell selection module 525, input/output interfaces 505, memory 530 for storing power data reports, rankings data of neighboring cells, and instruction module 535 for calculating by various solutions and other criteria about power data at neighboring cells, etc. and for accessing cells within the vicinity for the premium and non-premium users. The network 640 (i.e., 5G network) may include a base station 575, processor 545 for registering UE for slice access, scheduling units 555, broadcast module 548 for broadcasting slice ID, slice offset values for neighboring cells and other system information, authentication module 550 for authenticating a UE, network slices 570, etc. and a BW adaptation module 560. The UE 510 communicates with the network and reads broadcasted system information at a cell 510 in which the UE 510 is camped in an idle mode. For example, if the UE 510 is camped at a cell A, then the UE 510 would receive slice IDs and slice offset values for neighboring cells of cell A via the transceiver 520 and process the information via the processor 515 to perform measurements and calculate using cell reselection equations of the cell selection module 525 (e.g., using a cell reselection logic or process) to select a next cell where the cell selection process is based on a ranking of the neighboring cells.

The scheduling unit 555 can communicate with a control unit 557, and a BW adaptation module 560, etc. . . . via element management systems (EMS) 590 (i.e., or alternate control units) to direct various logic components in channel power management and the control unit 557 in traffic shaping and beam management. In addition, the control unit 557 with the scheduling unit 555 can perform actions for allocating channels, allocating beams, filtering network traffic, allocating slots, mini-slots and setting mini-slot configuration periods across channels by managing a set of frequency settings by an automated workflow of the cell 610 of the parts (shown in FIG. 3) of the radio receiver, the UPS, battery circuit (i.e., DC power supply), the cell site (i.e., node) calls/dropped calls/throughput in operation, the server. The EMS 590 monitors via the distribution units (DUs) 630 and the central units (CUs) 640 the various nodes and cells in the network and commercial power supplied and controls or send instructions to the various components of the cell 610 to maintain the quality of service (QoS) of the cell site with the backup power supplies when there is a power outage. The automated workflow maintains the network availability and monitors the status of network devices, including the commercial power supplied to the network. The EMS 590 can also be connected to multiple eNodeB for power management. When an AC power outage in the network occurs, the automated workflow which is monitoring the network for power outages instructs the EMS 590 via various logic components to reduce the output power of the radio receiver and also takes into account other factors by communicating with the radio receiver, cell site via a router (or another communication link) connected to the server 620 in reducing the output power for transmission. This, in turn, reduces the DC power and the draw on the UPS.

In an exemplary embodiment, the server 620 can be configured as NB-IoT Server is a software for data collection and monitoring and communicating via the router for activating the automated workflow via the EMS 590 and can display the log messages of each base station and the survival status of all sessions (including information such as signal, power, etc.).

After the detection of an interrupt of the commercial power, power failure, power loss, and/or AC power outage of the network, the automated workflow, which is monitoring the components and the network, detects the change and the power loss. The automated workflow in response to the detected power loss implements the configuration management functions via the scheduling unit 555 for mini-slot allocations and frequency settings, the BW adaptation module 560 of slice assignments, and available BWPs at the cell 610. The EMS 590 communicates with the radio receiver, the server 620 (i.e. hosting power management data sets), and other components associated with the cell site, to send messages via the cell site router to receiver collect cell statistics, and to execute appropriate plug and play functionality of the base station radio receiver. The automated workflow executes various functions to the element management system based on decisions from the BW adaptation module 560 and data from the cell site and base station.

As described, a data networking system includes several data processing components, each of which is patentable, and/or have patentable aspects, and/or having processing hardware capable of performing automated processes that are patentable. This document is not intended to limit the scope of any claims or inventions in any way, and the various components and aspects of the system described herein may be separately implemented apart from the other aspects.

What is claimed is:

1. A system for determining backup battery power for RF radio operations at a base station, comprising:

a data communications interface configured to communicate via an API tool to receive a first plurality of data sets describing a plurality of power sources and a second plurality of data sets from a plurality of cell sites, wherein each of the second plurality of data sets describes power usage at one of the cell sites, and wherein each of the data sets is formatted using an open API format; and a data processor configured to correlate the first plurality of data sets of the various operated distributed power sources with the second plurality of data sets of power usage at the cell site and to forecast a frequency and a duration of a power outage at the cell site based on the correlated data;

wherein a backup power supply is configured with a capacity at the cell site based on the metrics derived from the correlated data wherein the capacity backup power supply is determined in accordance with the frequency and the duration of the power outage at the cell site.

2. The system of claim 1 wherein the capacity of the backup power supply is determined in accordance with operations of a battery controller to reduce the draw on the backup power supply responsive to a detected power loss.

3. The system of claim 2, wherein an element management system is instructed to change settings of components based on data communicated from the cell site.

4. A computer program product tangibly embodied in a computer-readable storage device and comprising a set of instructions that, when executed by a processor, perform a method for an operational mode of a base station at a cell site when a power interrupt or power loss is detected, the method comprising:

communicating with an API tool of the base station to receive a plurality of data sets using an open API format about metrics of various operating distributed power sources;

monitoring power usage by the base station at the cell site and generating a series of data sets about the power usage at the cell site;

correlating the plurality of data sets of the various operated distributed power sources with the series of data sets of power usage at the cell site to thereby forecast a frequency and a duration of a power outage at the cell site; and configuring a backup power supply with a capacity at the cell site based on the metrics derived from the correlated data wherein the capacity backup power supply is determined in accordance with the frequency and the duration of the power outage at the cell site.

5. The computer program product of claim 4, further comprising:

communicating with a radio receiver and a server via a cell site router to exchange messages about power requirements of components of the cell site based on forecasted power operating data of the cell site.

6. The computer program product of claim 5, further comprising:

reducing an amount of power drawn by at least one backup power supply activated in response to a power interrupt or power loss to extend an operation time of the at least one backup power supply.

7. The computer program product of claim 6, further comprising:

reducing output power of the radio receiver by changing settings of cell site components to reduce a maximum radio receiver load while taking into account power demand data indicative of component loads in an operating cell site.

8. The computer program product of claim 7, further comprising:

monitoring by element management system via logic, the power data of components on the cell site.

9. The computer program product of claim 8, further comprising;

changing by the element management system settings of components of multiple cell sites based on aggregated data communicated by multiple cell site servers about availability of power.

10. An automated process executed by a network power management system having a processor, memory, and input/output interfaces, wherein the processor is configured to execute instructions stored in the memory to manage backup battery life at a cell site, the automated process comprising:

receiving a plurality of data sets configured according to an open API format, wherein the plurality of data sets comprise metrics of various operating distributed power sources;

monitoring power usage at the cell site to generate a series of data sets about the power usage at the cell site;

correlating the plurality of data sets of the various operated distributed power sources with the series of data sets of power usage at the cell site to thereby forecast a frequency and a duration of a power outage at the cell site; and configuring a backup power supply with a capacity at the cell site based on the metrics derived from the correlated data wherein the capacity backup power supply is determined in accordance the frequency and the duration of the power outage at the cell site.

11. The automated process of claim 10 further comprising activating an automated workflow in response to aggregated power data indicative of a power loss to a network, cell site, and base station to crop input power to at least a radio receiver of the cell site and base station.

12. The automated process of claim 10, further comprising:

communicating with the radio receiver and a server via a cell site router to exchange messages about requirements of components of the cell site based on current operating data of the cell site;

reducing an output power of the radio receiver by changing settings of cell site components to reduce a maximum radio receiver load while taking into account data indicative of component loads in an operating cell site; and reducing an amount of power drawn by at least one back power supply activated in response to the power interrupt or power loss to extend an operation time of a backup power supply.

13. The automated process of claim 12, further comprising changing settings of components based on aggregated power data communicated from the cell site server.

14. The automated process of claim 13, further comprising changing settings of components of multiple cell sites based on collective data communicated by multiple cell site servers.

15. The automated process of claim 14, further comprising cropping input power to the cell site based on a scheduled operation to lessen effects of node degradations to users.

16. The automated process of claim 10 further comprising performing an automated workflow responsive to a detected loss of power.

\* \* \* \* \*